United States Patent Office 3,704,103
Patented Nov. 28, 1972

---

3,704,103
METHOD OF PREPARING SINGLE CRYSTALS OF MERCUROUS CHLORIDE
Cestmir Barta, Prague, Czechoslovakia, assignor to Ceskoslovenska Akademie Ved, Prague, Czechoslovakia
No Drawing. Filed Jan. 20, 1970, Ser. No. 4,417
Int. Cl. C01g *13/04*
U.S. Cl. 23—305          5 Claims

ABSTRACT OF THE DISCLOSURE

Method of preparing single crystals of mercurous halides, which comprises separating the respective mercurous halide from the ambient atmosphere, heating the system to a temperature of at least 120° centigrade, and cooling to the respective crystallization temperature after a pressure of at least 0.015 torr in the system has been reached.

BACKGROUND OF THE INVENTION

The present invention relates to a method of preparing single crystals of mercurous halide which are particularly suitable for optical purposes.

World-wide attention has been given to the possibilities of using various single crystals for technical applications.

Despite this fact, no attention has been given as yet to the utilization of single crystals of mercurous halides such as mercurous chloride, although some excellent physical characteristics of this substance have placed it in the foreground among crystals to be used in polarizers, compensators and similar optical appliances in which, above all, birefringence, high refractive index, high-grade optical dispersion capacity and other physical properties of single crystals play an important part. The absence of mercurous chloride in technological practices appears to be attributed to the fact that in the preparation of this material in crystalline form numerous allegedly unsurmountable problems have been encountered. Mercurous chloride, namely, is practically insoluble in water (at 20° centigrade $2 \cdot 10^{-4}$ grams only can be dissolved in 100 grams of water) as well as in alcohol, acetone, ether and other organic solvents, its solubility in acids, salt solutions and melts being also rather poor. It can be successfully converted into solution form only after having been oxidized to strongly toxic mercuric chloride ($HgCl_2$). Thus the method of preparing technically usable single crystals of mercurous chloride from solutions, eutectic melts or the like are out of the question. Even some hydrothermal processes cannot be used to this end, since the presence of water catalyzes the decomposition to mercury and mercuric chloride according to the following equation:

$$Hg_2Cl_2 \rightarrow Hg + HgCl_2 \qquad (1)$$

which reaction leads moreover to hydrolysis. Under normal conditions even the possibilities of preparing single crystals from the gaseous phase, or from the actual melt are out of the question, since mercurous chloride does not melt under these conditions but sublimates to a white fibrous mass.

The purpose of the present invention and the basic object of the same is to overcome the aforementioned disadvantages and to significantly improve the method of preparing single crystals of mercurous halide.

SUMMARY OF THE INVENTION

In accordance with the present invention a method of preparing single crystals of mercurous halides, and more particularly mercurous chloride, is provided which comprises isolating the respective mercurous halide from the ambient atmosphere, as for instance in a sealed ampoule made of quartz glass, heating the system to a temperature of at least 120° centigrade, and finally cooling it successively to the crystallization temperature, after a pressure of at least 0.015 torr in the system has been reached.

The present invention results from the knowledge that mercurous chloride melts if the pressure of its vapors above the crystal amounts to at least 77 torr, and that by condensation from the gaseous phase big homogeneous crystals can be obtained if the pressure of mercurous chloride vapors above the crystal attains at least 0.015 torr, both said conditions being attainable e.g. by heating in a closed or sealed system.

Further the invention is based upon the experience that in the actual process of preparation, an excessively high pressure, in the sealed system where the single crystal of mercurous chloride is prepared has to be prevented, and that it is necessary to previously evacuate the system, as for example to $10^{-5}$–$10^{-6}$ torr at a temperature of from 120 to 170° centigrade, and to free the same from water as well as from other volatile constituents. In view of the fact that the respective sealed system, if heated to a temperature over 300 or even over 400° centigrade, is exposed to abrupt or even reasonably abrupt increases of pressure, the operating temperature has to be selected with respect to the technological appliances available, such as for example to the strength of the ampoule receiving the sealed system of $Hg_2Cl_2$.

DESCRIPTION OF THE PREFERRED EMBODIMENTS

Thus, according to a preferred embodiment of the present invention and in keeping with the aforesaid conditions, the single crystals of mercurous halide can be obtained substantially in two different ways, such as (1) by crystallization, and (2) after condensation from gaseous phase by separate crystallization on that end portion of the ampoule which is opposite to the heated end portion thereof. In either case it is necessary to slowly move the partially, as for example to one third of its capacity filled ampoule from the higher temperature zone to the lower temperature one. To obtain the best results the temperature gradient between the two aforesaid zones should be as slow as possible and the temperature difference should not surpass the limit of 200° centigrade.

The speed of movement of the ampoule from the warmer zone to the cooler one is identical with the linear speed of the crystal growth of which optimum value in case of crystals of about 30 millimeters diameter is within in a range of about one to 5 millimeters per hour. This optimum value of crystal growth speed is indirectly proportional to the size of the crystal grown. In practice, it is advantageous if the ampoule end portion where the crystal begins to grow is slightly flared within an angle of less than 30° whereupon after attaining a diameter of from 5 to 10 millimeters, it is at least once narrowed again by one third or one half, and then again conically flared to desired diameter.

The decomposition of mercurous chloride to mercury and mercuric chloride is not only catalysed by the presence of water but also by light. Thus, the ordinary mercurous chloride has a certain tendency to blacken which makes the single crystals for some technical applications absolutely unusable. This phenomenon, however, can be prevented, on the one hand, by complete dehydration of the starting material in one of the well-known processes, and, on the other hand, by doping the crystal with bivalent mercury to suppress the undesirable reaction. In the crystallization process as hereinbefore referred to, i.e. by condensation, this doping occurs spontaneously, since in the gaseous phase a certain amount of mercuric chloride is present, as results from the above Equation 1. The doping with bivalent mercury which acts simultaneously as luminiscence activator, can be optionally suppressed in that to the starting material metallic mercury is admixed whereby it is possible to slightly reduce the operating pressure in the ampoule.

To improve the quality of the single crystals produced it is, in certain cases, advantageous to subject them to a thermal treatment, wherein within the temperature range of from 125 to 135° centigrade during the cooling process a delay period is provided. In case the thermal treatment is carried out beyond the space of the crystallizer, i.e. for instance in the ampoule, it is advisable to operate with exclusion of water steam; in some cases also the operation in a medium containing a trace amount of mercuric chloride and having a vapor tension corresponding to the temperature employed, proves to be advantageous.

Analogous conditions hold also for other halides of monovalent mercury.

Other advantages of the present invention will result from the following examples which are given as illustrative only without, however, limiting the invention to the specific details thereof.

EXAMPLE I

Into a quartz glass ampoule of 30 mm. dia. and of length of 250 mm., which was narrowed on one of its end portions, there were inserted 150 grams of resublimated pulverized mercurous chloride doped with 0.1 mole percent of elementary mercury. To the narrowed end portion of the ampoule there was previously fused a quartz rod (10 mm. dia., 900 mm. length) terminated in an eyelet to attach a brass wire strand of a displacing mechanism. The ampoule with the mercurous chloride therein was then evacuated to the pressure of $1.10^{-5}$ torr, sealed and inserted into the middle of the lower part of a two-part vertical tubular resistor furnace so that the narrowed ampoule portion with the fused-on supporting quartz rod pointed upwards. The furnace was then heated so that its upper part (of 500 mm. length) reached the temperature of 250° centigrade within two hours while the lower part of the furnace reached 300° centigrade within the same period. After one hour's delay the ampoule was displaced by means of the displacing mechanism at the speed of 2 mm./h. from the middle of the lower part into the middle of upper part of the two-part resistor furnace, whereupon the temperature was slowly reduced within 6 hours' period to the room temperature, a two hours' delay having been provided at 120° centigrade during the cooling. The ampoule together with the single crystal was then removed from the furnace, opened, and the crystal worked up to polarizing prism. The thus obtained single crystal had specific gravity 7.15 and its birefringence in light was 0.68.

EXAMPLE II

Into a quartz glass ampoule of the same configuration as described in Example I except that the conical part thereof was on its lower portion, there were inserted 200 grams of resublimated mercurous chloride together with 0.05 mole percent of mercuric chloride. The system was evacuated at 150° centigrade to the pressure of $1.10^{-6}$ torr. The ampoule was then sealed and inserted into the middle of the upper part of the vertical two-part tubular resistor furnace. The upper part of the furnace having the length of 600 mm. was then slowly heated within a period of 2½ hours to 310° centigrade while the lower part thereof having the length of 400 mm. was simultaneously heated to 240° centigrade. After two hours' delay the ampoule was displaced by means of the same mechanism as described in Example I at the speed of 5 mm. per hour from the middle of the upper part of the furnace to the middle of the lower part thereof, whereupon the temperature in this two-part furnace was reduced within 5 hours' period to the room temperature, with a delay period at 110° centigrade during the cooling. The ampoule was then removed from the furnace together with the single crystal therein, opened, and the crystal worked up to a compensating prism. Its specific gravity and birefringence had the same respective values as set forth in Example I.

EXAMPLE III

In the same way as described in Example I a single crystal of mercurous bromide was prepared, with the exception that into the ampoule of 20 mm. dia. there were inserted 80 grams of the starting material, and that the temperatures of the lower part of the two-part vertical furnace and of the upper part thereof were 315 and 230° centigrade, respectively. Specific gravity of the single crystal produced was 7.3.

EXAMPLE IV

The single crystal of mercurous chloride was prepared in the same way as in Example II, except with using a horizontal furnace.

EXAMPLE V

A single crystal of mercurous bromide was prepared under the same conditions as referred to in Example IV, with exception that a vertical furnace was used and that the operating temperature was 325° centigrade.

EXAMPLE VI

The same as in Example I except the ampoule was evacuated at 170° centigrade and that the upper part of the furnace was heated to 350° centigrade while the lower part thereof to 450° centigrade, the delay period during the thermal treatment being provided at 135° centigrade.

EXAMPLE VII

The same as in Example II except the diameter of the ampoule was 18 millimeters, and that the upper furnace part was heated to 530° centigrade while the lower part to 350° centigrade.

EXAMPLE VIII

The same as in Example III, with the exception that the temperatures of the lower part of the furnace and of the upper part thereof were 420 and 340° centigrade, respectively.

EXAMPLE IX

In the same way as described in Example I there was prepared a single crystal of mercurous fluoride from completely anhydric mercurous fluoride ($Hg_2F_2$). The only exception was that the temperatures of the upper and the lower furnace parts were 350 and 340° centigrade and that the interior of the ampoule was lined with a polytetrafluoroethylene (Teflon) coating. The crystal growth speed was measured to 0.1 mm. per hour.

EXAMPLE X

A single crystal of mercurous iodide ($Hg_2I_2$) was prepared from completely anhydric mercurous iodide in the same way as described in Example I. The temperatures of the upper and the lower parts of the furnace were 250 and 235° centigrade, the crystal growth speed having been 0.1 mm. per hour.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore such adaptation should and are intended to be comprehended within the meaning and range of equivalence of the following claims.

What is claimed as new and desired to be protected by Letters Patent is set forth in the appended claims:

1. Method of preparing single crystals of mercurous halides comprising the steps of isolating said mercurous halide from ambient atmosphere in a sealed ampoule, heating said mercurous halide to a temperature of at least 120° centigrade until a pressure is reached in said ampoule of at least 0.015 torr and then gradually cooling said mercurous halide to a temperature wherein said mercurous halide crystallizes.

2. The method according to claim 1, wherein said ampoule is formed of quartz glass.

3. The method according to claim 1, wherein the halide is selected from the group consisting of chloride, bromide, iodide, or fluoride.

4. The method according to claim 2, including the step of dehydrating said mercurous halide and doping said mercurous halide with bivalent mercury prior to isolation in said ampoule.

5. The method according to claim 2, wherein said ampoule is heated at one end and said crystal is drawn to the other end, the temperature gradient between the ends of said ampoule being sufficient to cause crystallization of said heated mercurous halide.

References Cited

UNITED STATES PATENTS 2,570,408   10/1951   Garder _____ 28—87 R

FOREIGN PATENTS 816,620   9/1956   Great Britain _____ 23—294
1,121,845   7/1968   Great Britain _____ 23—87

OTHER REFERENCES

Mellor—Comp. Treatise Inorganic & Theoret. Chem., vol. 4, pp. 796–805.

NORMAN YUDKOFF, Primary Examiner

S. SILVERBERG, Assistant Examiner

U.S. Cl. X.R.

23—87 R, 294